United States Patent [19]

Matsumura et al.

[11] 4,399,266
[45] Aug. 16, 1983

[54] LADDERY LOWER ALKYLPOLYSILSESQUIOXANE HAVING HEAT-RESISTANT THIN FILM-FORMABILITY AND PROCESS FOR PREPARING SAME

[75] Inventors: Yoshio Matsumura, Yamato; Ikuo Nozue, Yokohama; Osahiko Tomomitsu, Yokohama; Takashi Ukachi, Yokohama; Taro Suminoe, Tokyo, all of Japan

[73] Assignee: Japan Synthetic Rubber Co., Ltd., Tokyo, Japan

[21] Appl. No.: 353,811

[22] Filed: Mar. 2, 1982

Related U.S. Application Data

[63] Continuation-in-part of Ser. No. 294,218, Aug. 19, 1981, abandoned.

[30] Foreign Application Priority Data

Aug. 26, 1980 [JP] Japan .............................. 55-116493
Jul. 17, 1981 [JP] Japan .............................. 56-110736
Aug. 26, 1981 [EP] European Pat. Off. ........ 81303911.2

[51] Int. Cl.$^3$ ............................................. C08G 77/00
[52] U.S. Cl. ...................................... 528/10; 528/12; 528/14; 528/20; 528/21; 528/43; 556/459; 556/463
[58] Field of Search .................. 528/10, 12, 14, 20, 528/21, 43; 556/459, 463

[56] References Cited

U.S. PATENT DOCUMENTS

| | | | |
|---|---|---|---|
| 3,000,858 | 9/1951 | Brown, Jr. ............................. | 528/43 |
| 3,017,385 | 1/1962 | Sprung et al. ........................ | 528/12 |
| 3,234,179 | 2/1966 | Katchman et al. .................... | 528/12 |
| 3,318,844 | 5/1967 | Krantz .................................. | 528/14 |
| 3,355,399 | 11/1967 | Cekeda .................................. | 528/10 |
| 3,372,133 | 3/1968 | Krantz .................................. | 528/12 |
| 4,273,420 | 6/1981 | Watanabe et al. ..................... | 528/43 |

*Primary Examiner*—Melvyn I. Marquis
*Attorney, Agent, or Firm*—Oblon, Fisher, Spivak, McClelland & Maier

[57] ABSTRACT

A laddery lower alkylpolysilsesquioxane represented by the formula:

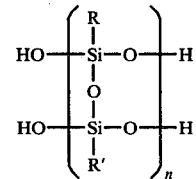

wherein R and R′ represent same or different lower alkyl groups, and n represents an average degree of polymerization, said laddery lower alkylpolysilsesquioxane having a heat-resistant thin film-formability, characterized in that 15 to 30% by weight of the lower alkylpolysilsesquioxane is occupied by the portion having a standard polystyrene-reduced molecular weight of 20,000 or less as measured by gel permeation chromatography. Said silicone resin in which R and R′ are methyl is prepared by dissolving $CH_3SiCl_3$ in a ketone or an ether, adding water to this solution with stirring to hydrolyze $CH_3SiCl_3$, condensing the hydrolyzate and, if necessary, subjecting the resulting condensate to a treatment for adjusting the proportion of the low molecular weight portion in the product.

28 Claims, 1 Drawing Figure

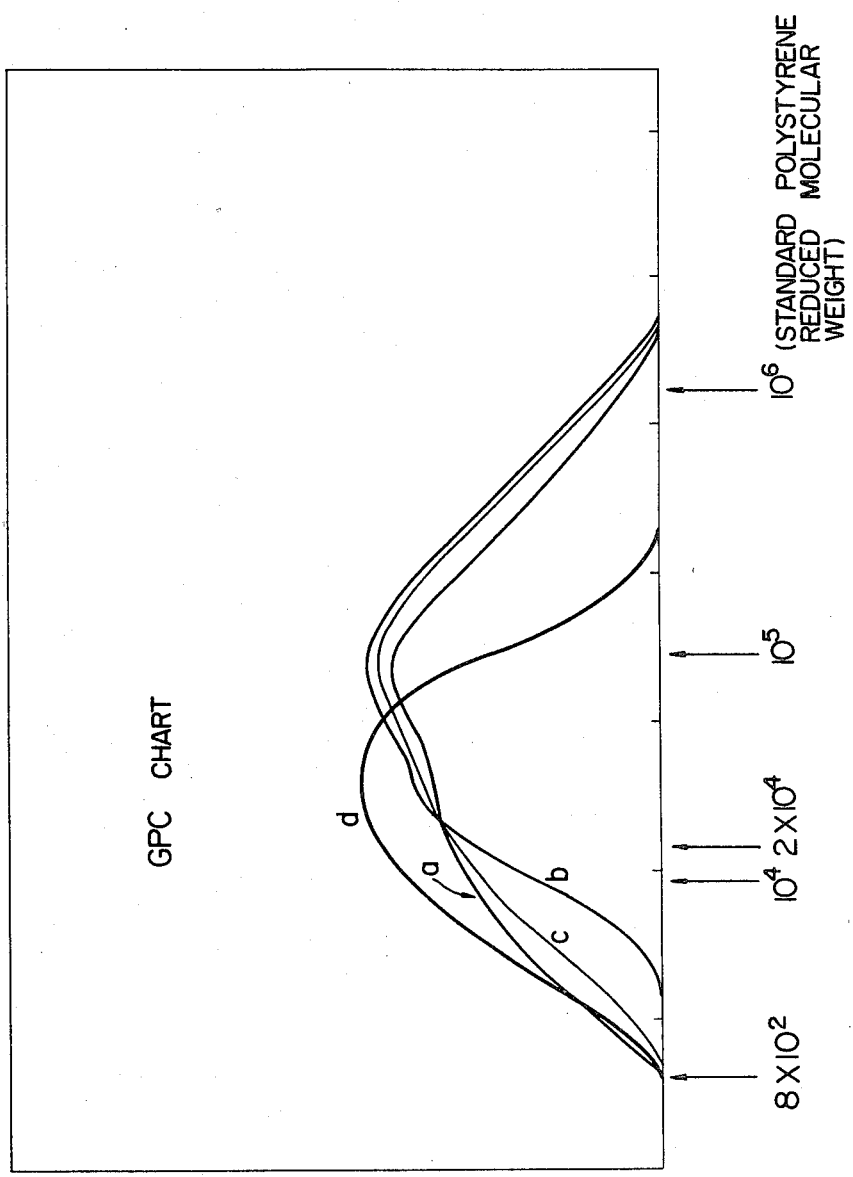

LADDERY LOWER ALKYLPOLYSILSESQUIOXANE HAVING HEAT-RESISTANT THIN FILM-FORMABILITY AND PROCESS FOR PREPARING SAME

CROSS-REFERENCES TO RELATED APPLICATIONS

This application is a continuation-in-part of application Ser. No. 294,218, filed Aug. 19, 1981 and now abandoned.

This invention relates to a laddery lower alkylpolysilsesquioxane having a heat-resistant thin film-formability and being suitable as an insulating protective film (passivation film) or interlayer insulating film for integrated circuits. More particularly, the invention relates to a laddery lower alkylpolysilsesquioxane containing a laddery lower alkylpolysilsesquioxane having a relatively low molecular weight in the specific amount.

Organopolysiloxanes having an atomic ratio of oxygen to silicon of 1.5 are generally called polysilsesquioxanes, and among such polysilsesquioxanes, the so-called laddery polysilsesquioxanes are noticed particularly as a highly heat-resistant silicone resin. For this reason, extensive research has been made recently on the techniques that enable such laddery polysilsesquioxanes to be used as insulating protective films or interlayer insulating films for integrated circuits. The resins used for these purposes are in some cases subjected to a temperature as high as 400° to 500° C., and hence, are required to have heat resistance, adhesiveness to substrate at elevated temperatures, moisture resistance and crack resistance. However, the heretofore known laddery lower alkylpolysilsesquioxanes are poor in crack resistance, that is, cracks tend to be formed when a thin film of the lower alkylpolysilsesquioxane is on a substrate, heated and cured at an elevated temperature, and thus, a solution to this problem has been desired.

As a result of extensive research to solve this problem, the present inventors have found that a laddery lower alkylpolysilsesquioxane having the specific molecular weight distribution, namely, a laddery lower alkylpolysilsesquioxane containing the portion having a specific relatively low molecular weight in the specific amount has markedly high crack resistance.

According to this invention, there is provided a laddery lower alkylpolysilsesquioxane represented by the formula:

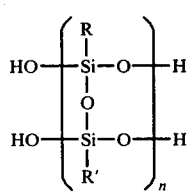

wherein R and R' represent same or different lower alkyl groups, and n represents an average degree of polymerization, said laddery lower alkylpolysilsesquioxane having a heat-resistant thin film-formability, characterized in that 15 to 30% by weight of the lower alkylpolysilsesquioxane is occupied by the portion having a standard polystyrene-reduced molecular weight of 20,000 or less, preferably about 800 to 20,000, as measured by gel permeation chromatography (referred to hereinafter as GPC).

In the formula representing the laddery lower alkylpolysilsesquioxane according to this invention, R and R' represent independently lower alkyl groups such as methyl group, ethyl group, n-propyl group or the like, and both R and R' may be the same or different although it is preferred that they are the same. Preferable laddery lower alkylpolysilsesquioxane is laddery methylpolysilsesquioxane which has R and R' both being methyl groups. In this case, the laddery methylpolysilsesquioxane shows a particularly high heat resistance, and when the uncured laddery methylpolysilsesquioxane is calcined by gradually elevating the temperature from room temperature to 700° C. in the air its weight retention reaches the order of 80–90%. Once the laddery methylpolysilsesquioxane has been heat-cured at 450° C. in nitrogen for 2 hours, the cured product is not reduced in weight even by heating it again up to 730° C. in nitrogen, and the weight retention reaches 95–96% when it is calcined at 800° C. in nitrogen. In said formula, n designates an average degree of polymerization, and a lower alkylpolysilsesquioxane having a standard polystyrene-reduced weight average molecular weight of 40,000 to 500,000 as measured by GPC is preferred in aspect of heat resistance and handling. A standard polystyrene-reduced weight average molecular weight of 50,000 to 300,000 is particularly preferred. When the proportion of the portion having the standard polystyrene-reduced molecular weight as measured by GPC of 20,000 or less is less than 15% by weight, cracks are formed when the lower alkylpolysilsesquioxane is heated at high temperatures, and when said proportion is more than 30% by weight cracks are also formed when it is heated at high temperatures, and the storage stability becomes bad, and gelation tends to be caused.

The laddery lower alkylpolysilsesquioxane according to this invention where R and R' are both methyl groups, for instance, can be produced by the following process: $CH_3SiCl_3$ is dissolved in an organic solvent comprising 50% by volume or more of a ketone or an ether, and water is added to this organic solvent solution with stirring to hydrolyze $CH_3SiCl_3$, after which the hydrolyzate is condensed, and if necessary the condensate thus obtained is further subjected to a treatment for adjusting the molecular weight distribution to obtain the objective laddery methylpolysilsesquioxane.

In this process, as mentioned above, $CH_3SiCl_3$ is dissolved in an organic solvent comprising 50% by volume or more of a ketone or an ether, but it is preferred to use a ketone or an ether alone as the organic solvent. The kind of the ketone or ether used is not critical. As the ketone, there may be used, for example, methyl ethyl ketone, diethyl ketone, methyl isobutyl ketone, and the like, and as the ether, there may be used, for example, ethylene glycol dimethyl ether, di-normal propyl ether, dioxane, diethylene glycol dimethyl ether, and the like. When a mixture of the ketone and the ether is used, the number average molecular weight of the resulting laddery methylpolysilsesquioxane is in some cases lower than when either of the ketone or the ether is used alone. However, when two or more ketones or two or more ethers are used, there is caused no problem of the lowering of number average molecular weight. Also, the ketone or ether used in this invention may be in the form of a mixture with an aliphatic hydrocarbon such as pentane, octane, or the like, an aromatic hydrocarbon such as toluene, xylene, or the like, a halogenated hydrocarbon such as 1,2-dichloroethane, 1,1,2-trichloroethane, 1,3-dichloropropane, chlorobenzene, or the like, an aliphatic alcohol such as n-propyl alcohol, n-butyl alcohol, isobutyl alcohol, or the like, or a fatty acid alkyl ester such as ethyl propionate, ethyl isobutyrate, isobutyl acetate, or the like. These solvents, when used together with the ketone or ether, are used in such an amount that the ketone or ether content in the solvent mixture is 50% by volume or more.

The amount of the ketone or ether used in the process of this invention is not critical and preferably 5 to 20 parts by volume per part by volume of $CH_3SiCl_3$. When a mixture of the ketone or ether with other solvents, the mixture is used in such an amount that the amount of the ether or ketone in the mixture fails in said range.

When adding water to the $CH_3SiCl_3$ solution with stirring, it is desirable to add the water gradually because of easier control of the reaction. The amount of water used is preferably about 3 to 30 moles per mole of $CH_3SiCl_3$.

After addition of water, the reaction mixture is heated on an oil bath or the like. The heating temperature may be any temperature not higher than 130° C., but a low temperature requires a long period of time for heating. Generally, it is recommendable to effect the heating at a temperature of from 80° to 120° C. for a period of about 2 to 6 hours. During the heating operation, the reaction mixture may be stirred or may be merely left as the solvent refluxes.

If an amine is present when hydrolyzing $CH_3SiCl_3$ and further condensing the hydrolyzate, the reaction proceeds smoothly even when the $CH_3SiCl_3$ concentration is high, allowing a laddery methylpolysilsesquioxane having a high molecular weight to be obtained. There may be used for this purpose various primary, secondary, or tertiary amines such as, for example, triethylamine, tri-normal propylamine, tri-isopropylamine, diethylamine, ethylamine, pyridine, ethylenediamine, and the like. Among them, triethylamine and diethylamine are most preferable. The amine may be added to the $CH_3SiCl_3$ solution before water is added thereto, or may be added to the organic solvent comprising 50% by volume or more of a ketone or ether before $CH_3SiCl_3$ is dissolved in said organic solvent. The amount of the amine used, although not critical, is preferably up to about 3 moles, more preferably 0.3 to 2 moles, per mole of $CH_3SiCl_3$.

In case an amine is added, a white precipitate of the hydrochloride of the amine added is formed gradually as water is added dropwise to the $CH_3SiCl_3$ solution, but said white precipitate dissolves with a further addition of water. After the completion of the addition of water, the reaction mixture is heated in the same manner as when no amine is added.

After the completion of the reaction, regardless of whether an amine is added or not, the solvent layer is washed with water, and the water washing is repeated until the washings become neutral, after which the solvent layer is generally dried with a desiccant such as anhydrous calcium sulfate for the purpose of preventing the laddery methylpolysilsesquioxane from gelling to obtain a laddery methylpolysilsesquioxane solution, and if necessary, the solvent is removed to obtain the laddery methylpolysilsesquioxane.

When the molecular weight distribution of the laddery lower alkylpolysilsesquioxane obtained by the above-mentioned process or the like is found to be unsatisfactory and the content of the portion having the standard polystyrene-reduced molecular weight of 20,000 or less, preferably about 800 to 20,000, as measured by GPC is outside the range of 15 to 30% by weight, the product thus obtained is further subjected to a suitable molecular weight distribution-regulating treatment by a fractionation method, a fractional gel permeation chromatography or a blending method so that the content of said low molecular weight portion falls within the range of 15 to 30% by weight as defined above. According to the fractionation method, the obtained laddery lower alkylpolysilsesquioxane solution is mixed with a solvent in which the laddery lower alkylpolysilsesquioxane is not dissolved, such as acetonitrile or the like, to precipitate the laddery lower alkylpolysilsesquioxane to obtain the laddery lower alkylpolysilsesquioxane having the desired molecular weight distribution. In this case, it is necessary to properly select the concentration of the laddery lower alkylpolysilsesquioxane solution and the type and amount of the solvent in which said lower alkylpolysilsesquioxane is not dissolved. In the case of fractional gel permeation chromatography, the laddery lower alkylpolysilsesquioxane solution obtained in the manner described above is subjected to GPC to eliminate the undesired molecular weight fraction and recover a solution of laddery lower alkylpolysilsesquioxane having the desired molecular weight distribution and, if necessary, the solvent is removed from the recovered solution to obtain the desired laddery lower alkylpolysilsesquioxane. The blending method is performed by mixing the solutions of two or more laddery lower alkylpolysilsesquioxanes differing in molecular weight distribution from each other and removing the solvent, where necessary, to obtain a laddery lower alkylpolysilsesquioxane having the desired molecular weight distribution.

The laddery lower alkylpolysilsesquioxane having the specified molecular weight distribution according to this invention can be formed into a thin film by dissolving the same in a proper solvent, coat the resulting solution on a substrate and dry the coating. As the coating method, these may be employed commonly used methods such as spray coating, spinner coating, and the like. The thin film formed according to such a method remains free of cracking in the state where the solvent has been evaporated to dry the resin before heat-curing or in a state after heat-curing, or even after a heat treatment at 400° to 500° C. has been effected after the heat-curing, so that it can be widely utilized as a heat-resistant insulating protective film or as a heat-resistant interlayer insulating film, particularly in the field of electronic parts for integrated circuits.

The accompanying drawings show gel permeation chromatography charts (GPC charts) of the laddery lower alkylpolysilsesquioxanes obtained in Examples 1 and 2 and Comparative Examples 1 and 2, which appear hereinafter, in which charts the ordinate indicates the concentration of the laddery lower alkylpolysilsesquioxane solution separated by GPC, and the abscissa indicates the standard polystyrene-reduced molecular weight.

This invention is further explained in more detail below referring to Examples and Comparative Examples, and the Examples are merely by way of illustration and not by way of limitation.

In the Examples and Comparative Examples, the GPC measurement was conducted under the following conditions:

Apparatus: High temperature high speed gelpermeation chromatogram manufactured by the Waters company in the U.S.A. (Model 150-C ALC/GPC)
Column: SHODEX A-8M manufactured by Showa Denko Company Limited (length: 50 cm)
Measurement temperature: 40° C.
Flow rate: 1 cc/min Under the above conditions, tetrahydrofuran was used as the solvent, and 1 g of the laddery lower alkylpolysilsesquioxane was dissolved in 100 cc of said solvent. The resulting solutions were used as test samples. As the standard polystyrene, there was used the standard polystyrene manufactured by the Pressure Chemical company in the U.S.A.

EXAMPLE 1

In a reactor equipped with a refluxing condenser, a dropping funnel and a stirrer was placed 1200 ml of methyl isobutyl ketone, and thereto were added 140 ml of $CH_3SiCl_3$ and 80 ml of triethylamine. The reactor was cooled with ice and 200 ml of water was added dropwise gradually with stirring to the reactor. A white precipitate of triethylamine hydrochloride was formed gradually in the course of this operation, but it dissolved as water was further added. Upon completion of water addition, the reaction mixture was refluxed for 5 hours on an oil bath at 100° C. After the completion of the reaction, the solvent layer was washed with water until the washings became netural, followed by drying with anhydrous sodium sulfate as a desiccant. Then the desiccant was removed and the solvent was removed by distillation under reduced pressure to obtain a laddery methylpolysilsesquioxane. This laddery methylpolysilsesquioxane was dried in vacuo overnight at 40° C. and then subjected to the measurement of molecular weight by GPC, to obtain the curve a in the GPC chart of the accompanying drawings. It is understood from this curve that the product contains the low molecular weight portion of a standard polystyrene-reduced molecular weight of not more than 20,000, specifically 800 to 20,000, in a proportion of 27% by weight, and has a standard polystyrene-reduced weight average molecular weight of 110,000.

In 10 ml of toluene was dissolved 2.5 g of the thus obtained laddery methylpolysilsesquioxane and the resulting solution as spinner coated on a silicon wafer at 1,500 r.p.m. The coated product was then heated at 80° C. for one hour to remove the solvent and then heat-cured at 350° C. for one hour to obtain a thin film. This thin film was further subjected to a heat treatment at 450° C. for 30 min and then allowed to stand at room temperature. In this case, no cracking was also caused. The thickness of the film obtained was 2 μm.

COMPARATIVE EXAMPLE 1

The methyl isobutyl ketone solution of the laddery methylpolysilsesquioxane obtained in Example 1 was concentrated until the concentration became 28% by weight (the liquid amount being 300 ml), and the concentrate was poured into 4 liters of acetonitrile to precipitate the laddery methylpolysilsesquioxane. The thus obtained laddery methylpolysilsesquioxane was dried in vacuo overnight at 40° C. and then subjected to the measurement of molecular weight by GPC to obtain the curve b in the GPC chart in the accompanying drawings. It is seen from this curve that the low molecular weight portion of a standard polystyrene-reduced molecular weight of not more than 20,000, specifically 800 to 20,000, was contained in a proportion of 13% by weight, and that the standard polystyrene-reduced weight average molecular weight was 161,000. That is, the proportion of the low molecular weight portion was smaller than that in Example 1.

In 10 ml of toluene was dissolved 2.5 g of the thus obtained laddery methylpolysilsesquioxane, and the resulting solution was spinner-coated on a silicon wafer at 1,500 r.p.m., and the coated product was heated at 80° C. for one hour, then heat-cured at 350° C. for one hour and subsequently heat-treated at 450° C. for 30 minutes as in Example 1, upon which cracks were formed in the thin film. The thickness of this thin film was 2 μm.

EXAMPLE 2

The methyl isobutyl ketone solution of the laddery methylpolysilsesquioxane obtained according to Example 1 from which the desiccant had been removed was concentrated until the concentration reached 60% by weight (liquid amount, 150 ml), and the concentrate was poured into 450 ml of acetonitrile to precipitate the laddery methylpolysilsesquioxane. The thus obtained laddery methylpolysilsesquioxane was dried in vacuo overnight at 40° C. and then subjected to the measurement of molecular weight distribution by GPC to obtain the curve c in the GPC chart of the accompanying drawings. It is seen from this curve that the low molecular weight portion of a standard polystyrene-reduced molecular weight of not more than 20,000, specifically 800 to 20,000, was contained in a proportion of 20% by weight, and the standard polystyrene-reduced weight average molecular weight was 136,000.

In 10 ml of toluene was dissolved 2.5 g of the thus obtained laddery methylpolysilsesquioxane and the resulting solution was spinner-coated on a silicon wafer at 2,000 r.p.m. The coated product was heated at 80° C. for one hour, then heat-cured at 350° C. for one hour and subsequently heat-treated at 450° C. for 30 minutes as in Example 1, upon which no cracks were formed. The thickness of the thin film thus obtained was 1.8 μm.

COMPARATIVE EXAMPLE 2

In 33 ml of toluene was dissolved 8 g of the laddery methylpolysilsesquioxane obtained in Example 1, and to the resulting solution was 56 ml of acetonitrile while maintaining the solution at 25° C. The resulting mixture was well stirred. Upon the formation of precipitates, the precipitate and the supernatant were subjected to a centrifuge at 15,000 r.p.m. for 40 minutes to separate them. To the supernatant thus obtained was added 8 ml of acetonitrile while maintaining the solution at 25° C., and the resulting mixture was well stirred. Upon the formation of precipitates, the precipitates and the supernatant were subjected again to a centrifuge at 15,000 r.p.m. for 40 minutes. Subsequently, the supernatant was removed by distillation under reduced pressure, and the residue was dried at 40° C. overnight in vacuo. The molecular weight distribution of the laddery methylpolysilsesquioxane was measured by GPC to obtain the curve d in the GPC chart in the accompanying drawings. From this curve, it is seen that the low molecular weight portion of a standard polystyrene-reduced molecular weight of not more than 20,000, specifically 800 to 20,000, was contained in a proportion of 39% by weight and the standard polystyrene-reduced weight average molecular weight was 33,000. Thus, the proportion of the low molecular weight portion was larger than that in Example 1.

In 10 ml of toluene was dissolved 2.5 g of the laddery methylpolysilsesquioxane thus obtained, and the resulting solution was spinner-coated on a silicon wafer at 2,000 r.p.m. The coated product was heated at 80° C. for one hour, then heat-cured at 350° C. for one hour and subsequently heat-treated at 450° C. for 30 minutes, upon which cracks were formed in the thin film thus obtained. The thickness of the thin film was 1.7 μm.

What is claimed is:

1. A laddery lower alkylpolysilsesquioxane having a heat resistant thin film-formability represented by the formula:

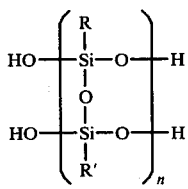

wherein R and R' represent same or different lower alkyl groups, and n is an average degree of polymerization, characterized in that 15 to 30% by weight of the laddery lower alkylpolysilsesquioxane is occupied by the low molecular weight portion having a standard polystyrene-reduced molecular weight of 20,000 or less as measured by gel permeation chromatography.

2. The laddery lower alkylpolysilsesquioxane according to claim 1, wherein R and R' in the formula are independently methyl groups, ethyl groups or n-propyl groups.

3. The laddery lower alkylpolysilsesquioxane according to claim 1 or 2, wherein R and R' in the formula are the same.

4. The laddery lower alkylpolysilsesquioxane according to claim 1, wherein R and R' in the formula are both methyl groups.

5. The laddery lower alkylpolysilsesquioxane according to claim 1, 2, or 4, wherein the standard polystyrene-reduced weight average molecular weight of the whole of the laddery lower alkylpolysilsesquioxane is 40,000 to 500,000.

6. The laddery lower alkylpolysilsesquioxane according to claim 1, 2, or 4, wherein the standard polystyrene-reduced weight average molecular weight of the whole of the laddery lower alkylpolysilsesquioxane is 50,000-300,000.

7. The laddery lower alkylpolysilsesquioxane according to claim 5, wherein the low molecular weight portion has a standard polystyrene-reduced molecular weight of 800 to 20,000.

8. A process for preparing a laddery methylpolysilsesquioxane represented by the formula:

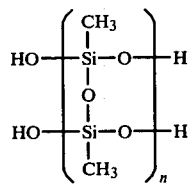

wherein n is a degree of polymerization, which comprises dissolving $CH_3SiCl_3$ in an organic solvent mixture comprising a ketone or an ether in an amount of 50% by volume or more, adding water to the resulting organic solvent solution with stirring to hydrolyze $CH_3SiCl_3$, then condensing the hydrolyzate and adjusting the molecular weight distribution of the product by a fractionation, a fractional gel permeation chromatography or a blending method so that the low molecular weight portion having a standard polystyrene-reduced molecular weight of 20,000 or less as measured by gel permeation chromatography is contained in a proportion of 15 to 30% by weight.

9. The process according to claim 8, wherein the low molecular weight portion has a standard polystyrene-reduced molecular weight of 800 to 20,000.

10. The process according to claim 8 or 9, wherein the laddery methylpolysilsesquioxane as the whole has a standard polystyrene-reduced weight average molecular weight of 40,000 to 500,000.

11. The process according to claim 8, or 9, wherein $CH_3SiCl_3$ is dissolved in an organic solvent comprising a ketone in an amount of 50% by volume or more.

12. The process according to claim 8, or 9, wherein the organic solvent is composed only of a ketone or a mixture of two or more ketones.

13. The process according to claim 11, wherein the ketones are selected from the group consisting of methyl ethyl ketone, diethyl ketone and methyl isobutyl ketone.

14. The process according to claim 8, or 9, wherein $CH_3SiCl_3$ is dissolved in an organic solvent comprising an ether in an amount of 50% by volume or more.

15. The process according to claim 8, or 9, wherein the organic solvent is composed only of an ether or a mixture of two or more ethers.

16. The process according to claim 14, wherein the ethers are selected from the group consisting of ethylene glycol dimethyl ether, di-normal propyl ether, dioxane, and diethylene glycol dimethyl ether.

17. The process according to claim 8, or 9, wherein the organic solvent mixture further comprises an aliphatic hydrocarbon, an aromatic hydrocarbon, a halogenated hydrocarbon, an aliphatic alcohol or a fatty acid alkyl ester in an amount of less than 50% by volume.

18. The process according to claim 8, or 9, wherein the amount of the ketone used is 5 to 20 parts by volume per part by volume of $CH_3SiCl_3$.

19. The process according to claim 8, or 9, wherein the amount of the ether used is 5 to 20 parts by volume per part by volume of $CH_3SiCl_3$.

20. The process according to claim 8, or 9, wherein water is used in an amount of 3 to 30 moles per mole of $CH_3SiCl_3$.

21. The process according to claim 8, or 9, wherein the condensation temperature is 130° C. or below.

22. The process according to claim 8, or 9, wherein the condensation temperature is from 80° to 120° C.

23. The process according to claim 22, wherein the condensation reaction is carried out for a period of 2 to 6 hours.

24. The process according to claim 8, or 9, wherein the condensation reaction is carried out in the presence of an amine.

25. The process according to claim 24, wherein the amine is triethylamine, tri-normal propylamine, triisopropylamine, diethylamine, ethylamine, pyridine or ethylenediamine.

26. The process according to claim 24, wherein the amine is triethylamine or diethylamine.

27. The process according to claim 24, wherein the amine is used in an amount of about 3 moles or less per mole of $CH_3SiCl_3$.

28. The process according to claim 24, wherein the amine is used in an amount of 0.3 to 2 mols per mole of $CH_3SiCl_3$.

* * * * *